US007697896B2

(12) United States Patent
Maekawa et al.

(10) Patent No.: US 7,697,896 B2
(45) Date of Patent: Apr. 13, 2010

(54) COMMUNICATION APPARATUS PREVENTING COMMUNICATION INTERFERENCE

(75) Inventors: Itaru Maekawa, Tokyo (JP); Jun Nishihara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1004 days.

(21) Appl. No.: 11/372,982

(22) Filed: Mar. 10, 2006

(65) Prior Publication Data

US 2006/0221926 A1 Oct. 5, 2006

(30) Foreign Application Priority Data

Mar. 16, 2005 (JP) ............................. 2005-074526

(51) Int. Cl.
*H04B 1/00* (2006.01)
*H04B 15/00* (2006.01)
(52) U.S. Cl. .................... 455/63.1; 455/63.3; 455/41.2; 455/574; 455/67.13; 455/114.2; 370/310; 370/401; 370/338; 370/311; 375/259
(58) Field of Classification Search ............... 455/63.1, 455/454, 344, 445, 419, 41.2, 63.3, 67.13, 455/114.2, 574; 370/401, 310, 321, 445; 375/259

See application file for complete search history.

(56) References Cited

U.S. PATENT DOCUMENTS

| 5,684,828 | A * | 11/1997 | Bolan et al. ................. 340/10.2 |
| 6,167,450 | A * | 12/2000 | Angwin et al. ............... 709/227 |
| 6,181,916 | B1 * | 1/2001 | Mou et al. .................... 455/572 |
| 6,600,726 | B1 * | 7/2003 | Nevo et al. .................... 370/278 |
| 6,842,607 | B2 * | 1/2005 | Godfrey et al. ............. 455/41.2 |
| 7,039,358 | B1 * | 5/2006 | Shellhammer et al. ..... 455/41.2 |
| 7,280,801 | B2 * | 10/2007 | Dahl .......................... 455/41.2 |
| 7,450,610 | B2 * | 11/2008 | An .............................. 370/468 |
| 7,492,736 | B2 * | 2/2009 | Ho .............................. 370/329 |

(Continued)

FOREIGN PATENT DOCUMENTS

EP 1 207 654 5/2002

(Continued)

OTHER PUBLICATIONS

Japanese Office Action dated Jan. 29, 2008, from the corresponding Japanese Application.

(Continued)

*Primary Examiner*—Marceau Milord
(74) *Attorney, Agent, or Firm*—Katten Muchin Rosenman LLP

(57) ABSTRACT

A game apparatus according to a preferred embodiment includes a first wireless communication module and a second wireless communication module. The first wireless communication module performs communication utilizing Bluetooth protocols, whereas the second wireless communication module performs communication utilizing IEEE802.11 protocols. The first radio communication module and the second radio module have a common reference communication cycle, and each communicates in communication cycles of an integral multiple of a reference communication cycle. A control unit sets offset time between from the start time of a communication by the first wireless communication module until the start time of a communication by the second wireless communication module. In so doing, the control unit monitors the communication load of the first wireless communication module and sets the offset time based on a monitored result.

20 Claims, 4 Drawing Sheets

U.S. PATENT DOCUMENTS

| | | | |
|---|---|---|---|
| 7,535,881 B2 * | 5/2009 | Maekawa et al. | 370/338 |
| 2003/0214961 A1 * | 11/2003 | Nevo et al. | 370/401 |
| 2004/0259642 A1 * | 12/2004 | Tanaka et al. | 463/42 |

FOREIGN PATENT DOCUMENTS

| | | |
|---|---|---|
| JP | 2005-142860 | 6/2005 |
| WO | 03/105418 | 12/2003 |
| WO | 2004/023746 | 3/2004 |
| WO | 2004/051933 | 6/2004 |
| WO | 2004/079999 | 9/2004 |

OTHER PUBLICATIONS

Extended European Search Report dated Jul. 3, 2006 corresponding to European Application 06251365.0.

"IEEE Std 802.15.2-2003: Coexistence of Wireless Personal Area Networks with Other Wireless Devices Operating in Unlicensed Frequency Bands" [Online] Aug. 28, 2003, IEEE, New York, USA, XP007900722 Retrieved from the Internet: URL:http://standards.ieee.org/getieee802/download/802.15.2-2003.pdf [retrieved on Jun. 20, 2006].

* cited by examiner

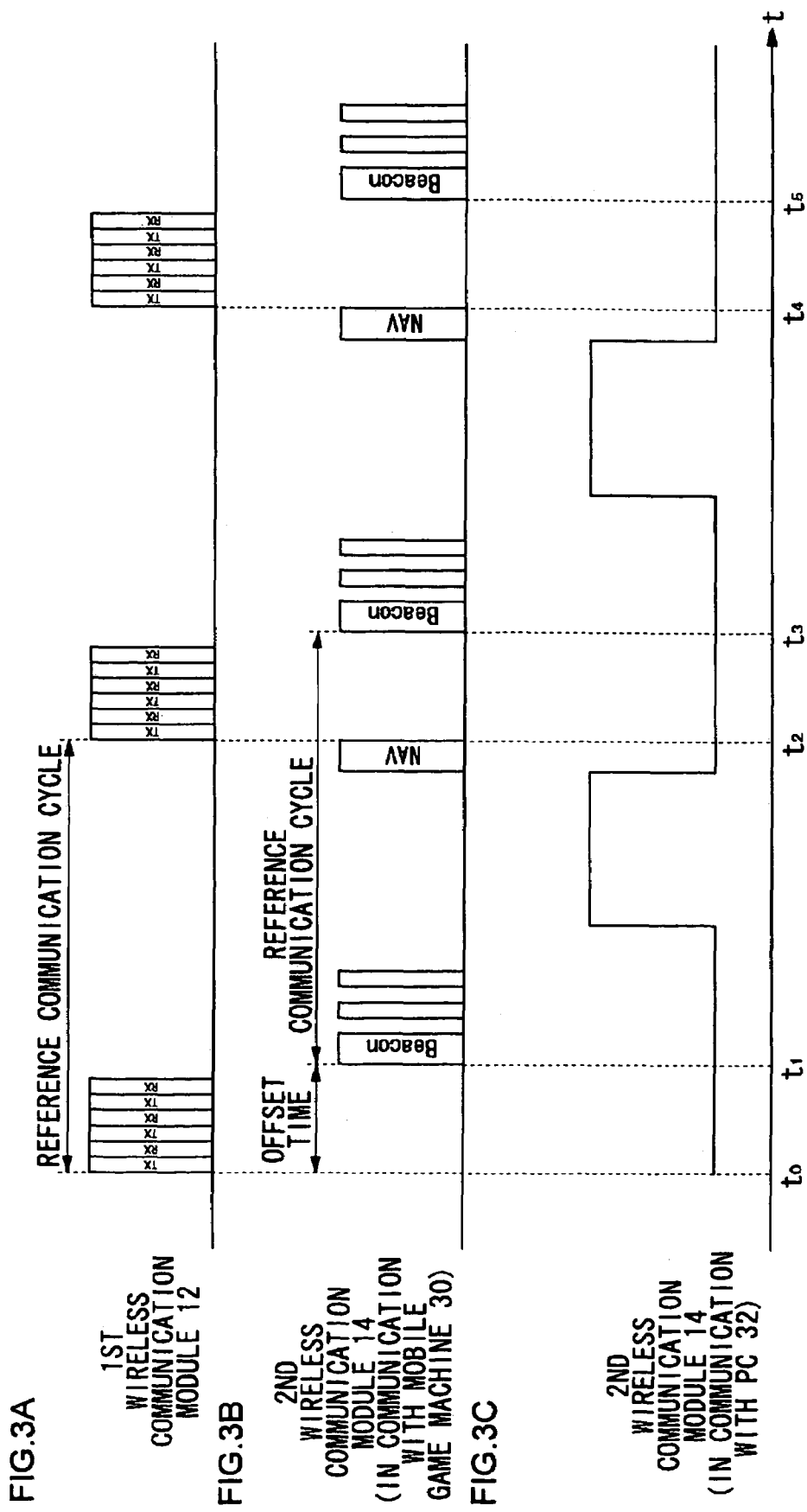

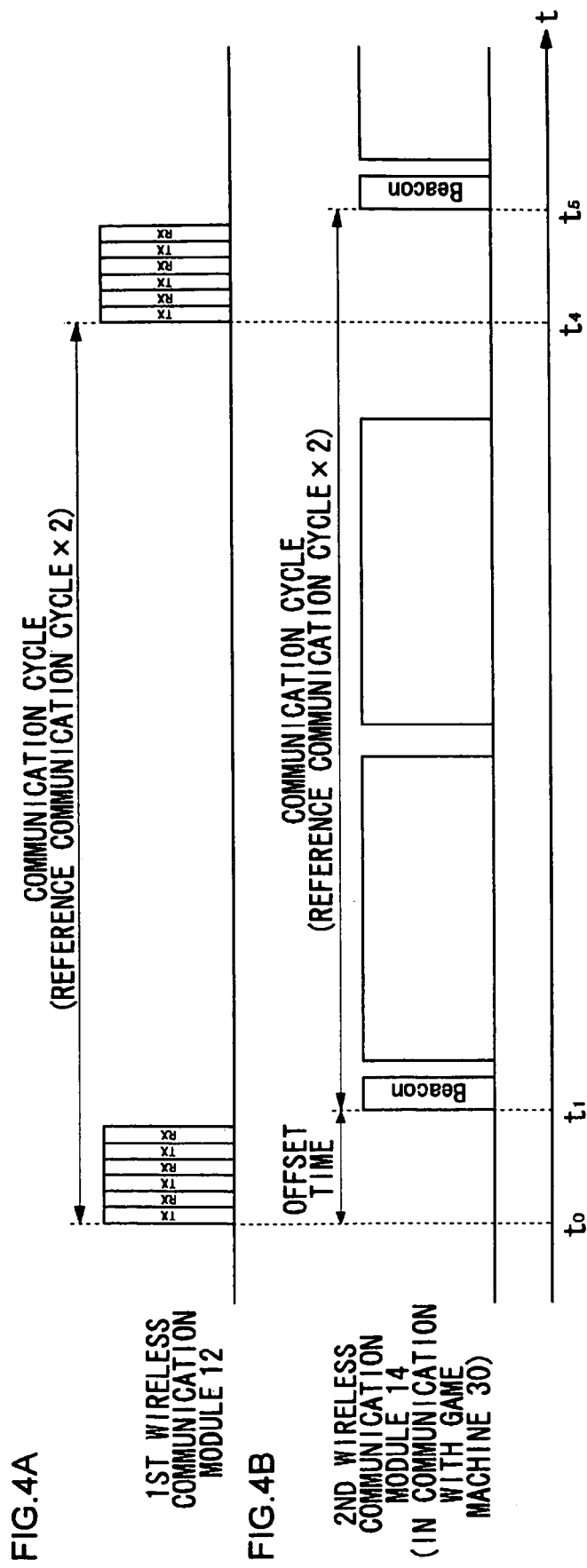

COMMUNICATION APPARATUS PREVENTING COMMUNICATION INTERFERENCE

BACKGROUND OF THE INVENTION

1. Field of the Invention

The present invention relates to radio communication apparatuses having wireless communication functions therein, and it particularly relates to a communication terminal apparatus equipped with a plurality of communication modules.

2. Description of the Related Art

In recent years, a variety of wireless communication protocols have been proposed and put to practical use. Representative of such protocols are the IEEE 802.11 and Bluetooth (registered trademark standardized by the IEEE802.15.1. Incorporated into diverse information terminal apparatuses, such technologies are used in wireless connection with peripheral devices, such as PDAs (personal digital assistants), printers and headsets. Owing to the technological innovation of recent years, wireless communication modules today are manufactured small and inexpensive, and it is also possible to build modules employing multiple types of wireless communication protocols into a single device or casing.

A wireless communication module must be able to transmit signals for a certain distance, receive weak radio waves transmitted by a peripheral device and reproduce signals therefrom. Accordingly, a wireless communication module is structured by a transmitter capable of high output and a receiver with high sensitivity.

If a plurality of wireless communication modules are built into a single device or casing, those wireless communication modules will be placed in close proximity to one another because of the limited space. As a natural consequence, mutual interference of radio waves occurs among the wireless communication modules themselves. In particular, the problem of mutual interference can be pronounced between a wireless communication protocol defined by the IEEE 802.11 and a wireless communication protocol defined by the Bluetooth, both of which use the same 2.4 GHz band.

A technology developed for the Bluetooth protocol to avoid interference among different wireless communication modules is called AFH (Adaptive Frequency Hopping). The AFH technology stabilizes communication under the Bluetooth protocols by frequency hopping, in which a Bluetooth communication module avoids the use of the frequency bands occupied by the other communication modules in the same frequency band and uses only usable frequencies for communications.

However, when a plurality of wireless communication modules are built into a single device or casing, those wireless communication modules must be placed in close proximity to one another. Thus, the use of AFH alone as countermeasure cannot sufficiently eliminate the mutual interference of radio waves therebetween. Especially when a wireless communication module is in a transmission mode and at the same time another adjacent wireless communication module is in a reception mode, the latter cannot avoid receiving the high-output transmission waves outputted by the former in close vicinity. Consequently, the signals to be received primarily may get buried in the received radio waves, thus creating a situation where necessary signals cannot be reproduced properly. Therefore, it is strongly desired that a technology be developed that can realize stable communications when a plurality of wireless communication modules are built into a single device or casing.

SUMMARY OF THE INVENTION

In order to solve the above problems, a communication terminal apparatus according to a preferred embodiment of the present invention comprises a first wireless communication module and a second wireless communication module which have a reference communication cycle common thereto. The first wireless communication module and the second wireless communication module each executes a communication in an integral multiple of the reference communication cycle. The communication periods of the first wireless communication module and the second wireless communication module are expressed by N times the reference communication cycle where N is an integer greater than or equal to 1. It is to be noted that the communication cycle of the first wireless communication module is not necessarily the same as that of the second wireless communication module and therefore it suffices if they are integral multiples of the reference communication cycle, respectively. The communication terminal apparatus according to this embodiment sets offset time between from start time of a communication by the first wireless communication module until start time of a communication by the second wireless communication module.

According to this embodiment, the offset time is set in a manner such that the communication by the second wireless communication module is started after the communication by the first wireless communication module has been completed. Thus, a state in which one communication is not interfered with by another communication can be created even if the communication terminal apparatus is equipped with a plurality of wireless communication modules.

It is to be noted that any arbitrary combination of the above-described structural components and expressions changed among a method, an apparatus, a system, a recording medium, a computer program and so forth are all effective as and encompassed by the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3C is a timing chart showing a communication state in a game apparatus according to an embodiment of the present invention.

FIGS. 4A and 4B is a timing chart showing a modification of the communication state in a game apparatus according to an embodiment of the present invention.

DETAILED DESCRIPTION OF THE INVENTION

In the description of preferred embodiments according to the present invention taken with the accompanying drawings, specific terms are used for the purposes of clarification and illustration of the present invention. The present invention described herein are not meant as limitations but are to be understood to include all the equivalent technologies that are implemented for the similar purpose under the similar rules.

Figure 1:
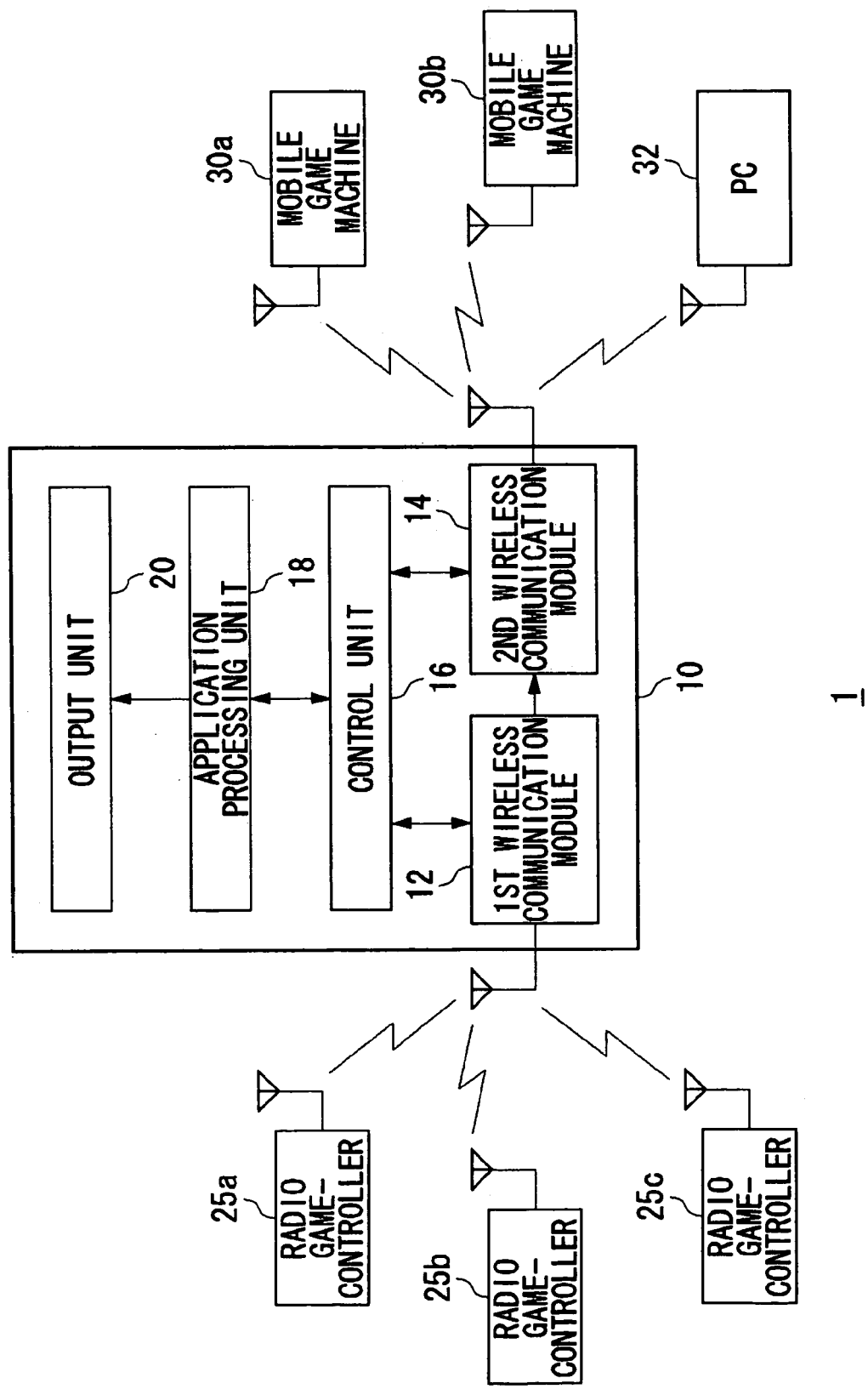
FIG. 1 illustrates a communication system according to an embodiment of the present invention.

FIG. 1 illustrates a structure of a communication system 1 according to an embodiment of the present invention. The communication system 1 includes a game apparatus 10, radio game-controllers 25a, 25b and 25c (hereinafter referred to as "radio game-controller 25") for wireless connection with the game apparatus 10, mobile game machines 30*a* and 30*b* (hereinafter referred to as "mobile game machine 30") and a personal computer 32 (hereinafter referred to as "PC 32"). The game apparatus 10 comprises, in a single device or casing, a first wireless communication module 12 and a second wireless communication module 14, both having communication functions, a control unit 16 which manages the entire game apparatus 10 in a controlled manner, an application processing unit 18 which executes game applications, and an output unit 20 which outputs the results of processing a game application. The game apparatus 10, which is provided with the first wireless communication module 12 and the second wireless communication module 14, functions as a wireless communication terminal apparatus. The first wireless communication module 12 and the second wireless communication module 14 can realize their respective communications using their respective wireless communication protocols.

In the communication system 1, the radio game-controllers 25 are game controllers for the game apparatus 10, and one or more users play a game by operating a radio game-controller 25 or radio game-controllers 25 while watching the game screen displayed on the display for the game apparatus 10. The mobile game machines 30 are terminal apparatuses that allow a plurality of persons to play a game simultaneously by getting a mobile game machine 30 in communication with another mobile game machine 30 via the game apparatus 10 serving as a relay station. The mobile game machine 30 may also have a function of receiving moving image data from the game apparatus 10 and offering the moving images to the users. Moreover, the mobile game machines 30 may be used as game controllers for the game apparatus 10, and the users may play a game by operating the mobile game machines 30 while watching the game screen displayed on the display for the game apparatus 10. Thus, the game apparatus 10 may function in response to a plurality of intended usages.

In the present embodiment, the first wireless communication module 12 enables wireless connections with a plurality of radio game-controllers 25 by performing wireless communications under the Bluetooth protocol. Bluetooth employs a frequency-hopping spread spectrum. In the communication system 1, the first wireless communication module 12 functions as a master to the radio game-controller 25 and the radio game-controller 25 functions as a slave thereto. A piconet is formed between the first wireless communication module 12 and the radio game-controller 25. A piconet is a network formed temporarily between Bluetooth terminals when they are placed close to one another, and a maximum of eight Bluetooth terminals can participate in a single piconet. Hence, the first wireless communication module 12 as a master can be wirelessly connected with a maximum of seven radio game-controllers 25.

The second wireless communication module 14 enables wireless connections with a plurality of mobile game machines 30 and a PC 32 by performing wireless communications under the IEEE802.11 protocol. The IEEE802.11 protocol to be employed may be IEEE802.11b and/or IEEE802.11g, for instance. In the communication environment of the IEEE802.11 protocol, the second wireless communication module 14 functions as an access point. In the MAC layer technology of wireless LAN using the IEEE802.11 protocol, CSMA/CA (Carrier Sense Multiple Access with Collision Avoidance) is employed as an access control system, so that the IEEE802.11 terminal has a function of transmitting data only after making certain that the communication channel is free for a predetermined length of time or more. This waiting time, which is the sum of a minimum time and the waiting times of random lengths for the respective terminals, prevents the collision of signals which may occur if a plurality of terminals transmit signals simultaneously a certain time after an immediately preceding communication.

The control unit 16 manages and controls communication functions in the first wireless communication module 12 and the second wireless communication module 14. According to the present embodiment, the control unit 16 sets offset time between from the communication start time of the first wireless communication module 12 until the communication start time of the second wireless communication module 14, in order to reduce the mutual interference between the first wireless communication module 12 and the second wireless communication module 14. The control unit 16 sets a first communication period, during which the communication by the first wireless communication module 12 is permitted, based on the number of radio game-controllers 25 managed by the first wireless communication module 12. By setting the offset time longer than or equal to the first communication period, the situation can be avoided where the communication by the second wireless communication module 14 starts before the communication by the first wireless communication module 12 has been completed. The control unit 16 may also set a second communication period, during which the communication by the second wireless communication module 14 is permitted, based on the number of mobile game machines 30 managed by the second wireless communication module 14. In such a case, the control unit 16 may set a communication cycles for the first wireless communication module 12 and/or the second wireless communication module 14 so that the first communication period and the second communication period should not overlap with each other on the time axis. Accordingly, the mutual interference of radio waves between the wireless communication modules can be reduced or eliminated so as to realize a game apparatus 10 capable of executing stable communications.

The first wireless communication module 12 receives operation inputs for game applications from a single radio game-controller 25 or a plurality of radio game-controllers 25 and then supplies them to the application processing unit 18 via the control unit 16. Based on the received operation inputs, the application processing unit 18 executes the game applications. The output unit 20 is comprised of a display unit, a speaker and so forth, and a processing result by the application processing unit 18 is outputted to this output unit 20.

The second wireless communication module 14 receives the respective status information from a single mobile game machine 30 or a plurality of mobile game machines 30. The second wireless communication module 14 also transfers the information sent from a mobile game-machine 30 participating in the WLAN, to the other machines 30. As a result, a game application reflecting the status information on the other mobile game machines 30 is executed in each mobile game machine 30, so that a plurality of users can enjoy simultaneously the game by the respective mobile game machines 30. When a mobile game machine 30 is used as a game controller, the second wireless communication module 14 supplies the operation inputs from the mobile game machine 30 to the application processing unit 18 via the control unit 16, similarly to the first wireless communication module 12. When a mobile game machine 30 is used as a terminal for receiving moving images, the second wireless communication module 14 delivers moving image data to the mobile game machine 30. A description is given here of an exemplary case where status information on a game application is communicated between a second wireless communication module 14 and a mobile game machine 30.

Data transmission and reception related to the processing of a game application take place among a game apparatus 10, radio game-controllers 25 and mobile game machines 30 as shown in FIG. 1, so that real-timeliness of information transmission among them must be assured to one degree or another. Hence, in the communication system 1 according to the present embodiment, the communication related to the processing of a game application is stabilized by minimizing the overlapping of the period for communication by the first wireless communication module 12 and the period for communication by the radio game-controllers 25 on the time axis as much as possible.

On the other hand, the communication between the second wireless communication module 14 and the PC 32, which is not used for the execution of a game application, does not require strict real-timeliness. For example, a state of use is assumed in which the game apparatus 10 is connected to the Internet via a router and the PC 32 is transmitting and receiving Email. Accordingly, the communication between the second wireless communication module 14 and the PC 32 is carried out in the time zone where neither the communication between the first wireless communication module 12 and a radio game-controller 25 nor the communication between the second wireless communication module 14 and a mobile game machine 30 is taking place.

Figure 2:
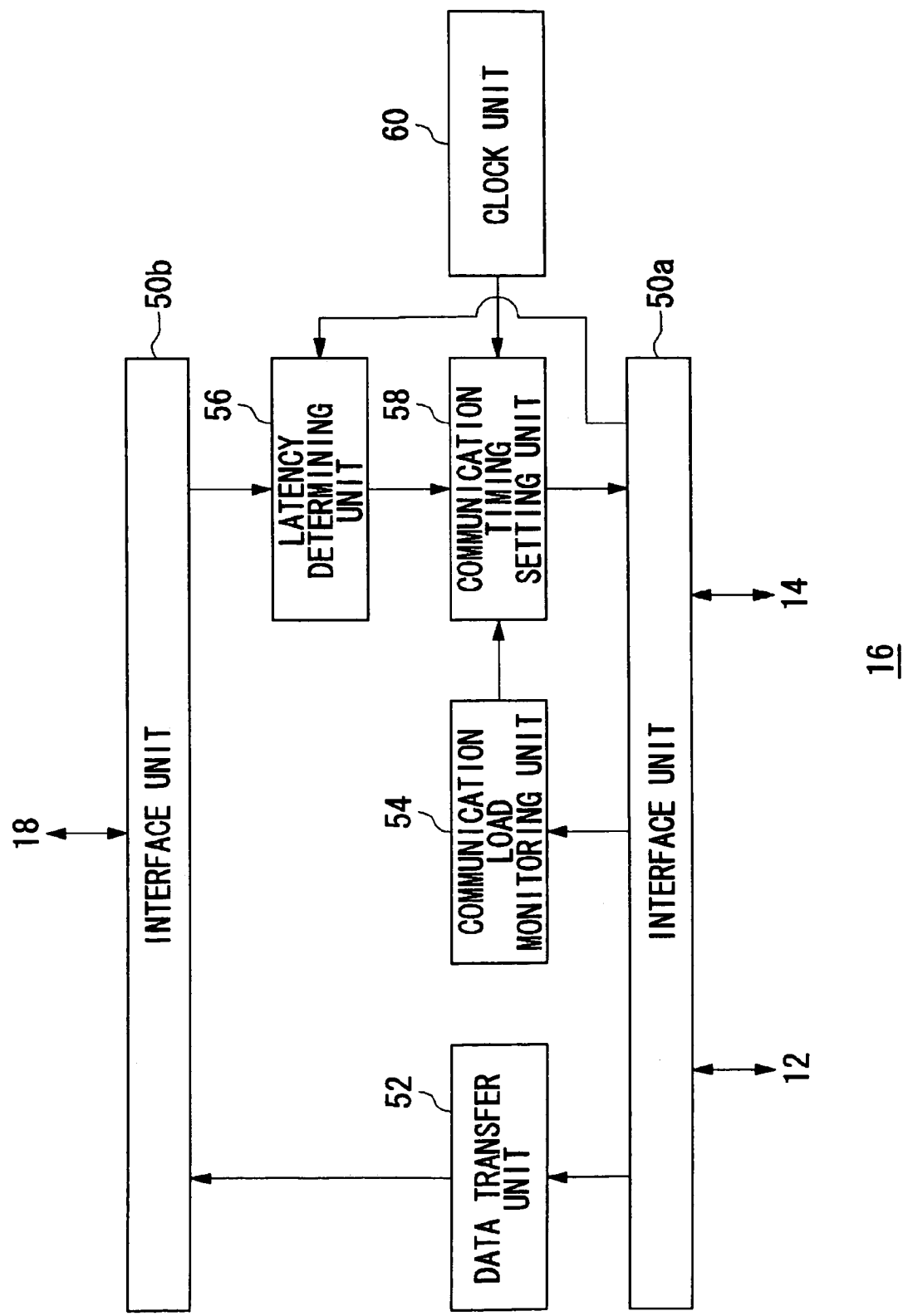
FIG. 2 is an example of function blocks for a control unit.

FIG. 2 is an example of a block diagram showing the functions of a control unit 16. The control unit 16, having an interface unit 50a between itself and a first wireless communication module 12 and a second wireless communication module 14 and an interface unit 50b between itself and an application processing unit 18, exchanges data with the other structures. The interface unit 50a and the interface unit 50b may have a common hardware structure.

The control unit 16 further includes a data transfer unit 52, a communication load monitoring unit 54, a latency determining unit 56, a communication timing setting unit 58 and a clock unit 60. Although the control unit 16 has a function of performing an overall control of the game apparatus 10, FIG. 2 shows, in particular, the function block for controlling the communication of the game apparatus 10.

The communication controlling functions are realized by a CPU, a memory, a memory-loaded program and the like, but drawn and described herein are function blocks that are realized in cooperation with those. The programs may be incorporated into a game machine 10 and may be supplied externally in a form stored in a recoding medium. Thus, it is understood by those skilled in the art that these function blocks can be realized in a variety of forms such as by hardware only, software only or the combination thereof.

The communication load monitoring unit 54 monitors the respective communication loads of the first wireless communication module 12 and the second wireless communication module 14. The communication load monitoring unit 54 may grasp the respective communication loads of the communication modules by monitoring the number of radio game-controllers 25 wirelessly connected to the first wireless communication module 12 and the number of mobile game machines 30 connected to the second wireless communication module 14. The communication load monitoring unit 54 may monitor the respective communication loads of the first wireless communication module 12 and the second wireless communication module 14 periodically. Also, when there is any change in the numbers of units connected thereto, the communication load monitoring unit 54 may monitor the communication loads by receiving the new numbers of units connected thereto from the respective wireless communication modules 12 and 14. The communication load monitoring unit 54 sends the results of monitoring the respective communication loads of the communication modules to the communication timing setting unit 58.

The communication timing setting unit 58 receives the result of monitoring the communication load of the first wireless communication module 12, and sets offset time between from the communication start time of the first wireless communication module 12 until the communication start time of the second wireless communication module 14. At this time, the communication timing setting unit 58 sets the first communication period, during which the communication by the first wireless communication module 12 is permitted, based on the communication load of the first wireless communication module 12. For example, where the first wireless communication module 12 is managing three radio game-controllers 25, it is necessary that there are a total of six time slots for polling the respective radio game-controllers 25 and receiving the responses therefrom. In this case, the communication timing setting unit 58 decides that the time for at least 6 time slots is necessary for the communication by the first wireless communication module 12 and thus sets the first communication period to the time for 6 time slots or more, or preferably the time for 6 time slots. As will be discussed later, it is preferable that the communication between the first wireless communication module 12 and a radio game-controller 25 be done in a bursty manner so as to facilitate the computation of the first communication period.

After the communication timing setting unit 58 has obtained the first communication period, the communication timing setting unit 58 sets the offset time to longer than or equal to the length of the first communication period. As a result, the second wireless communication module 14 starts a communication after the offset time has passed, namely, after the first communication period of the first wireless communication module 12 has terminated. Hence, the communication by the second wireless module 14 never starts communications before the end of the communication by the first wireless communication module 12. Accordingly, the mutual interference of communication between the first wireless communication module 12 and the second wireless communication module 14 can be reduced or eliminated. It is to be noted that the communication timing setting unit 58 may add time to search for a radio game-controller 25 which will newly establish a wireless connection with the first wireless communication module 12, to the first communication period necessary for the communication by the first wireless communication module 12, so as to set the offset time. The time to search a new radio game-controller 25 includes the time for the first wireless communication module 12 to "inquire" peripheral communication terminals about possible connection and the time therefor to "call" after recognizing such a radio game-controller 25.

In a game apparatus 10 according to the present embodiment, the first wireless communication module 12 and the second wireless communication module 14 have a reference communication cycle common thereto. In the first wireless communication module 12, which is a Bluetooth master, the reference communication cycle is set to the minimum interval of polling, which individually calls the radio game-controllers 25 at every operation during the intermittent operation in a sniff mode. On the other hand, in the second wireless communication module 14, the reference communication cycle is set as the minimum beacon interval under the IEEE802.11 protocol. With a game apparatus 10 according to the present embodiment, the results of processing by the application processing unit 18 are outputted as moving images from the output unit 20, and accordingly the reference communication cycle is set, for instance, to 11.25 msec based on the frame rate of the moving images.

The communication timing setting unit 58 sets the respective communication periods for the first wireless communication module 12 and the second wireless communication module 14 to certain integral multiples of the reference communication cycle. It is to be noted the integral multiple of the reference communication cycle includes one time (1×) the reference communication cycle, namely, the reference communication cycle itself. The first wireless communication module 12 and the second wireless communication module 14 communicate with their respective external terminals in the communication cycles, which are integral multiples of the reference communication cycle, by repeating their respective communication states and noncommunication states alternately. Since the respective communication starting times of the first wireless communication module 12 and the second wireless communication module 14 are equal to the starting times of their respective communication cycles, communications with the external equipment will start simultaneously with the starts of the communication cycles. In this patent specification, the communication cycle of the second wireless communication module 14 is the communication cycle used in the communication between the second wireless communication module 14 and a mobile game machine 30. As discussed earlier, the communication between the second wireless communication module 14 and a PC 32 takes place, using free time that may be present. Note that when there is no communication between the second wireless communication module 14 and the PC 32 during this free run time, the first wireless communication module 12 may search for a radio game-controller with which to establish a new wireless connection.

It is to be noted that it suffices if the respective communication cycles are integral multiples of the reference communication cycle and they are not necessarily the same. Setting an integral multiple length of a reference communication cycle for each of the communication periods can make the relative time difference in the start time of each of the communication periods constant. By implementing this arrangement, the offset time can, in principle, be fixed so long as there is no change in the number of external terminals connected to the first wireless communication module 12 and the second wireless communication module 14, and thus the communication timing setting unit 58 may determine the offset time only once.

The communication timing setting unit 58 receives the result of monitoring the communication load of the second wireless communication module 14, and sets the second communication period, during which the communication by the second wireless communication module 12 is permitted. Since the second wireless communication module 14 executes communications using the CSMA/CA scheme, so that it is not easy to determine the accurate time from the start to the end of the communication. Hence, it is preferable that the communication timing setting unit 58 predicts the time from the start to the end of communication based on the number of mobile game machines 30 controlled by the second wireless communication module 14 and then sets a second communication period by adding a certain time margin to the predicted time.

The communication timing setting unit 58 sets the first communication period and the second communication period in such a manner as to avoid the overlapping of them. It is to be noted that the first communication period is shorter than a communication cycle of the first wireless communication module 12. Similarly, the second communication period is shorter than a communication cycle of the second wireless communication module 14. Accordingly, when the sum of the first communication period and the second communication period is larger than M times (M an integer greater than or equal to 1) and not more than (M+1) times the reference communication cycle, the communication timing setting unit 58 sets each of the communication cycle of the first wireless communication module 12 and the communication cycle of the second wireless communication module 14 to (M+1) times the reference communication cycle or more. This arrangement can create a condition where there is no overlapping of the first communication period and the second communication period.

As described above, the communication timing setting unit 58 sets the communication cycles of the first wireless communication module 12 and the second wireless communication module 14, respectively, and sets also the offset time between from the communication start time of the first wireless communication module 12 until the communication start time of the second wireless communication module 14. The communication timing setting unit 58 conveys the communication cycle of the first wireless communication module 12 and the offset time to the first wireless communication module 12, and conveys also the communication cycle of the second wireless communication module 14 to the second wireless communication module 14. Since the offset time is directly used by the second wireless communication module 14, the communication timing setting unit 58 may convey the offset time directly to the second wireless communication module 14.

According to the above-described embodiments, the communication timing setting unit 58 sets the offset time between from the communication start time of the first wireless communication module 12 until that of the second wireless communication module 14, based on a monitored result of communication load of the first wireless communication module 12. As another example, it is possible that the communication timing setting unit 58 sets the offset time between from the communication start time of the second wireless communication module 14 until that of the first communication module 12, based on a monitored result of communication load of the second wireless communication module 14. For example, if the first wireless communication module 12 starts a communication under a situation where the second wireless communication module 14 is already executing a communication, offset time based on the communication start time of the second wireless communication module 12 may be set. In this case, too, the accurate time management can be facilitated by setting offset time by reference to the communication start time of the first wireless communication module 12, as will be described later.

FIGS. 3A to 3B is a timing chart showing a state of communication in a game apparatus according to the present embodiment. FIG. 3A shows a state of communication between the first wireless communication module 12 and a radio game-controller 25. FIG. 3B shows a state of communication between the second wireless communication module 14 and a mobile game machine 30. FIG. 3C shows a state of communication between the second wireless communication module 14 and the PC 32. Referring to the timing chart of FIGS. 3A to 3C, the communication cycle of the first wireless communication module 12 and the second wireless communication module 14 is set to one time (1×) the reference communication cycle. The start time of communication by the first wireless communication module 12 is identical to the start time of communication cycle of the communication module 12. In addition, the start time of communication by the second wireless communication module 14 is identical to the start time of communication cycle of the communication module 14. Thus, when the communication cycles of the respective communication modules 12 and 14 start, the communications by the communication modules 12 and 14 also start, respectively.

The first wireless communication module 12 starts communications with three radio game-controllers 25 at time $t_0$. It is preferred that the communication between the first wireless communication module 12 and the radio game-controller 25 be performed in a bursty manner and terminated within a short period of time. The first wireless communication module 12 performs polling in sequence with the three radio game-controllers 25, respectively. At each time, the first wireless communication module 12 receives data from the radio game-controller 25. The number of the first wireless communication modules 12 in use is only exemplary here, and one to seven radio game-controllers 25 can be controlled and managed by the first wireless communication module 12.

The first wireless communication module 12 notifies the second wireless communication module 14 that the communication be started at time to, and at the same time notifies it of offset time sent from the communication timing setting unit 58. As a result thereof, the second wireless communication module 14 can obtain time at which a communication starts, namely, TBTT (Target Beacon Transmission Time). In this example, the offset time is set to $(t_1-t_0)$. It is to be noted that the intervals $(t_3-t_2)$ and $(t_5-t_4)$ are identical to the offset time.

When the second wireless communication module 14 receives the notification of the communication start time of the first wireless communication module 12 and the offset time, it stands by during the offset time from time $t_0$ to $t_1$ and further stands by for a period of random waiting time called "back-off" thereafter and then sends a beacon signal. It is to be noted that the start time of communication may be represented as relative time from the notification time. The mobile game machines 30 under the control of the second wireless communication module 14 send the status information on the respective games when they receive the beacon signal.

The first wireless communication module 12 and the second wireless communication module 14 may operate on a common clock. For example, the clock may be supplied to the communication modules 12 and 14, respectively, from the clock unit 60 in the control unit 16. The clock used in either one of the first wireless communication module 12 and the second wireless communication module 14 may be supplied to the other. If a high-speed clock is employed in either the first wireless communication module 12 or the second wireless communication module 14, the use of this scheme will be desirable. Since the first wireless communication module 12 can transmit to and receive from the radio game-controllers 25 the data in a bursty manner under an accurate time control, the time management for the communication by the first wireless communication module 12 is achieved relatively easily. Hence, it is preferable that a clock be put to a common use between the first wireless communication module 12 and the second wireless communication module 14 by supplying the clock used in the first wireless communication module 12 to the second wireless communication module 14. If the first wireless communication module 12 and the second wireless communication module 14 are integrally structured, clocks may be supplied from a clock unit which is commonly provided. By sharing the same clocks, the both communication modules 12 and 14 can be easily synchronized.

According to the present embodiment, the communication cycles for the first wireless communication module 12 and the second wireless communication module 14 are set to integral multiples of a reference communication cycle, respectively. Therefore, the offset time from the communication start time of the first wireless communication module 12 until that of the second wireless communication module 14 can be fixed. As a result, it is only necessary that the offset time be conveyed to the second wireless communication module 14 only once. Thereafter, the respective communication modules 12 and 14 use the common clock, so that the stable communications can be performed, without mutual interference, based on the communication cycles set respectively.

The first wireless communication module 12 and the second wireless communication module 14 may operate on their own independent clocks, respectively. For example, if the first wireless communication module 12 and the second wireless communication module 14 are made by different manufactures, the respective communication modules will operate on their own clocks. Hence, it is difficult to achieve the exact synchronization therebetween. Thus, the first wireless communication module 12 may convey to the second wireless communication module 14 the communication start time of the first wireless communication module 12 on a periodic basis so as to align the synchronization. Even if the respective modules employ their own independent clocks, the actual difference between the clocks will be extremely small. Thus, adjusting the operation timing of the second wireless communication module 14 on a periodic basis makes it possible to maintain the state in which the first communication period of the first wireless communication module 12 does not overlap with the second communication period of the second wireless communication module 14.

As described above, the offset time is set in accordance with the time at which the communication in the first wireless communication module 12 has been all completed. Since the first wireless communication module 12 performs communication using Bluetooth protocols, the communication can be executed in a more bursty manner than using the IEEE802.11 protocols employed in the CSMA/CA scheme. Accordingly, the first communication period of the first wireless communication module 12 can be obtained accurately. Since the offset time is set by using the start time of the first wireless communication module 12 as a reference, the free time between the communication end time of the first wireless communication module 12 and the communication start time of the second wireless communication module 14 can be reduced. With reference to an example shown in FIGS. 3A to 3C, there is provided a little time margin between after the communication by the first wireless module 12 has been completed until a beacon is transmitted by the second wireless communication module 14. It is also possible that the communication cycle of the second wireless communication module 14 is started immediately after the completion of communication by the first wireless communication module 12 by setting the time interval from the communication start of the first wireless communication module 12 until the end thereof equal to the offset time and then a beacon signal is transmitted from the second wireless communication module 14. On the other hand, the communication timing setting unit 58 may set the offset time in a manner such that the time necessary for searching a radio game-controller 25 which establishes a new wireless connection with the first wireless communication module 12 is added up with the time at which the communication in the first wireless communication module 12 has all been completed. This search time may always be included in the offset time. Also, if the search frequency is to be reduced, the search time may be periodically included in the offset time.

The second wireless communication module 14 may restrict the communication executed between the communication module 14 and communication devices including the PC 32 and the mobile game machine 30, by transmitting packets (for example, RTS) that include a NAV (Network Allocation Vector). For example, the period during which a communication by NAV is restricted may be set equal to the offset time. The NAV is transmitted before the start time of a communication cycle of the first wireless communication module 12. Thereby, a possible mutual interference of the radio waves by the PC 32 against the first wireless communication module 12 can be reduced. If the second wireless communication module 14 is notified of the communication cycle of the first wireless communication module 12, the second wireless communication module 14 can obtain the overall picture of communication schedules in the game apparatus 10. Then the second wireless communication module 14 can grasp the first communication period of a communication between the first wireless communication module 12 and radio game-controller 25 and the second communication period of a communication between the second wireless communication module 14 and mobile game machine 30, so that the second wireless communication module 14 can communicate with the PC 32 by using the free time therebetween.

For instance, if equipment that restricts a communication can be identified by NAV, a period to restrict a PC 32 may be set by a NAV as the sum of the first communication period and the second communication period. Thereby, the interference, caused by the PC 32, of communications between the first wireless communication module 12 and the radio game-controller 25 and of communications between the second wireless communication module 14 and the mobile game machine 30 can be avoided. As a result, the communications in the communication system 1 can be more stabilized.

Since there is configured a dynamic wireless network in the communication system 1, not only a case where a new radio game-controller 25 participates in a piconet but also a case where an already participating radio game-controller 25 withdraws from the piconet is possible. In the control unit 16, the communication load monitoring unit 54 may monitor the change in the number of radio game-controllers 25 and the communication timing setting unit 58 may reset the offset time and/or the communication cycle according to the monitored result. The same is true of a case where a new mobile game machine 30 participates in a wireless LAN or an already participating mobile game machine 30 withdraws from the wireless LAN. That is, the communication timing setting unit 58 may reset the communication cycle according to the monitored result obtained by the communication load monitoring unit 54.

Referring back to FIG. 2, the data transfer unit 52 transmits operation inputs received by the interface unit 50*a* to the application processing unit 18 from the interface unit 50*b*. The application processing unit 18 performs processings according to the operation inputs, which cause the game to progress.

From the viewpoint of real-timeliness, the game applications can be roughly classified into two groups, namely, games requiring higher real-timeliness and games requiring lower real-timeliness. The games requiring higher real-timeliness are, for example, battle games or racing games, which are fast-progressing and thus require the operation inputs by the users to be reflected instantaneously in the game screen or other outputs. On the other hand, the games requiring lower real-timeliness are, for example, the match-up games such as shogi (Japanese chess) and mahjong, as well as RPGs (roll-playing games), whose progress is relatively slow.

The updating of a game screen is done at a predetermined frame rate or refresh rate. The rewrite speed for one field at the current stage is approximately 16.7 msec (1/60 sec). Therefore, with a game application requiring high real-timeliness, namely, minimal delay or low delay, it is desirable that the operation inputs from the radio game-controllers 25 be reflected on the game screen at least once per field (16.7 msec).

The same thing can be said of a mobile game machine 30 which uses the second wireless communication module 14 as the access point. That is, it is desirable that the mobile game machine 30 communicate its own status information to the other mobile game machines 30 and find out about the status information of the other mobile game machines 30 at least once per field. The status information in a racing game, for instance, includes such absolute information as the position on the course and the direction and speed of the racing car. It is to be noted that the use of absolute information here is on account of the less than adequate reliability of communication in the wireless environment, and therefore if a sufficient reliability can be obtained, knowing the difference information between the past and the present will suffice to achieve an intended result.

In the communication system 1, each of the mobile game machines 30 executes an application independently and asynchronously. It is to be noted that for game applications that do not require low delay or low latency, this does not produce any significant effect on the processing of such applications because retransmission processing can be used even when the data update cannot be done in each field.

In view of the aforementioned circumstances, the latency determining unit 56 monitors, via the interface unit 50*b*, the progress of game processed in the application processing unit 18 and then determines the degree of latency. The above indicates the latency required by the radio game-controller 25. However, the same thing can be said of the mobile game machine 30, and the latency determining unit 56 monitors, via the interface unit 50*a*, the progress of game in the mobile game machine 30 so as to determine the degree of latency required by the mobile game machine 30. The latency determining unit 56 transmits the determined degree of latency to the communication timing setting unit 58. Hereinbelow, the degree of latency required by the radio game-controller 25 will be discussed and examined.

If the low-delay is required of a radio game-controller 25, the communication timing setting unit 58 sets shorter the communication cycle of the first wireless communication module 12. As described earlier, the communication cycle of the first wireless communication module 12 is set to an integral multiple of a reference communication cycle (11.25 msec). Hence, the communication cycle is set to the minimum duration of a reference communication cycle which is 11.25 msec×1. If, on the other hand, no low-delay is required of a radio game-controller 25, that is, if the real-timeliness required in the progress of game is low, the communication cycle may be set to P times the reference communication cycle (P being an integer greater than or equal to 2). If the required real-timeliness is low, the power consumed by the radio game-controller 25 can be restricted by setting longer the communication cycle of the first wireless communication module 12. In this case, it is possible to set longer the second communication period for the second wireless communication module 14. It is also assumed that the second wireless communication module 14 transmits video data to the mobile game machines 30, so that the communication efficiency of a game apparatus 10 as a whole can be improved by setting shorter a period during which the first communication module 12 is active.

FIGS. 4A and 4B is a timing chart showing a modification of the communication state in a game apparatus 10 according to an embodiment of the present invention. FIG. 4A shows a state of communication between the first wireless communication module 12 and the radio game-controller 25. FIG. 4B shows a state of communication between the second wireless communication module 14 and the mobile game machine 30. The state of communication between the second wireless communication module 14 and the PC 32 is omitted in FIGS. 4A and 4B.

In the timing chart shown in FIGS. 4A and 4B, the communication cycle for the first wireless communication module 12 and the second wireless communication module 14 is set to double the reference communication cycle. This is the timing chart where no low-delay or minimum-delay is required, and it is assumed herein that a large amount of data is transmitted between the second wireless communication module 14 and the mobile game machine 30. As shown in FIGS. 4A and 4B, when the communication cycle of the first wireless communication module 12 is set longer, the second communication period of the second wireless communication module 14 can be set longer. During this second communication period, HCCA (Hybrid Coordination Function Controlled Channel Access) that guarantees the quality can be executed by a central control using the polling by the second wireless communication module 14.

In HCCA, the second wireless communication module 14 performs scheduling where a high priority is considered or actually placed on the mobile game machine 30, and the second wireless communication module 14 sends a polling frame representing a usable channel time that permits a transmission. During the transmission by the mobile game machine 30 in which the transmission is granted, the access from other mobile game machines 30 is restricted and thus the QoS can be guaranteed.

Although the above is for the case where no low-delay is required in the communications by the radio game-controllers 25, the communication cycle of the second wireless communication module 14 may be set longer even in a case where no low-delay is required in a communication by the mobile game machine 30. For example, when the low-delay is required in the communications by the radio game-controller 25 whereas no low-delay is required in the communications by the mobile game machine 30, the communication cycle of the first wireless communication module 12 is set to a reference communication cycle whereas that of the second wireless communication module 14 is set to at least double the reference communication cycle. The power consumed by the radio game-controller 25 and the mobile game machine 30 can be kept low or reduced by reducing the ratio of a communication period to a communication cycle.

The present invention has been described based on the embodiments which are only exemplary. It is therefore understood by those skilled in the art that other various modifications to the combination of each component and process are possible and such modifications are also within the scope of the present invention. In FIG. 1, the first wireless communication module 12 and the second wireless communication module 14 have their respective antennas. However, those antennas may be put to a common use. Since the communication periods for the first wireless communication modules 12 and those for the second wireless communication module 14 are assigned in such a manner as not to overlap each other, it is possible to commoditize the antennas.

In the communication system 1 as shown in FIG. 1, the mobile game machine 30 is in communication with the second wireless communication module 14 using the IEEE802.11 protocol. The mobile game machine 30 may further function as a Bluetooth master and therefore may communicate with other Bluetooth terminal apparatuses. In such a case, the mobile game machine 30 may be equipped with the communication functions similar to those of the game apparatus 10, and it is preferred that a communication with a Bluetooth terminal apparatus be executed during a communication period assigned between the first wireless communication module 12 and the radio game-controller 25.

What is claimed is:

1. A communication terminal apparatus comprised of a first wireless communication module and a second wireless communication module, the apparatus including:
    a control unit which sets offset time between the start time of a communication by the first wireless communication module and the start time of a communication by the second wireless communication module,
    wherein the first wireless communication module and the second wireless communication module, each being assigned a communication cycle defined by an integral multiple of a reference communication cycle utilized commonly by the first wireless communication module and the second wireless communication module, executes a communication in the communication cycle, the reference communication cycle being set so that the first wireless communication module and the second wireless communication module can each execute data communication related to the processing of an application, respectively, in the reference communication cycle.

2. A communication terminal apparatus according to claim 1, wherein said control unit sets communication cycles of the first wireless communication module and the second wireless communication module, respectively, to integral multiples of the reference communication cycle.

3. A communication terminal apparatus according to claim 1, wherein the start time of a communication by the first wireless communication module and the staff time of a communication by the second wireless communication module coincide with start time of communication cycles thereof, respectively.

4. A communication terminal apparatus according to claim 1, wherein said control unit monitors a communication load of the first wireless communication module and sets the offset time based on a monitored result.

5. A communication terminal apparatus according to claim 1, wherein said control unit sets a first communication period during which a communication by the first wireless communication module is permitted and sets the offset time to be longer than or equal to the first communication period.

6. A communication terminal apparatus according to claim 5, wherein said control unit sets a second communication period during which a communication by the second wireless communication module is permitted.

7. A communication terminal apparatus according to claim 6, wherein said control unit sets the first communication period and the second communication period in a manner that the both periods do not overlap with each other.

8. A communication terminal apparatus according to claim 6, wherein when the sum of the first communication period and the second communication period becomes greater than M times the reference communication cycle (M being an integer greater than or equal to 1), said control unit sets the communication cycles of the first wireless communication module and the second wireless communication module, respectively, to greater than or equal to M+1 times the reference communication cycle.

9. A communication terminal apparatus according to claim 1, wherein said control unit sets at least one of a communication cycle of the first wireless communication module and that of the second wireless communication module, based on latency required for a communication.

10. A communication terminal apparatus according to claim 1, wherein the reference communication cycle is set based on a frame rate of moving images.

11. A communication terminal apparatus according to claim 1, wherein the reference communication cycle is set so that the first wireless communication module and the second wireless communication module can execute a communication at least once, respectively, during a field period of moving images.

12. A communication terminal apparatus according to claim 11, wherein the reference communication cycle is set shorter than the field period of moving images.

13. A communication terminal apparatus according to claim 1, wherein a minimum interval of polling of a slave device is included in the reference communication cycle in the first wireless communication module, and a minimum beacon interval is included in the reference communication cycle in the second wireless communication module.

14. A communication system comprising a game apparatus, at least one radio game controller, and at least one mobile game machine; the game apparatus including:
   a first wireless communication module which communicates with the at least one radio game controller;
   a second wireless communication module which communicates with the at least one mobile game machine; and
   a control unit which sets offset time between the start time of a communication by the first wireless communication module and the start time of a communication by the second wireless communication module,
   wherein the first wireless communication module and the second wireless communication module, each being assigned a communication cycle defined by an integral multiple of a reference communication cycle utilized commonly by the first wireless communication module and the second wireless communication module, executes a communication in the communication cycle, the reference communication cycle being set so that the first wireless communication module can communicate with the at least one radio game controller in the reference communication cycle, and the second wireless communication module can communicate with the at least one mobile game machine in the reference communication cycle.

15. A method of controlling communication of a communication terminal apparatus comprised of a first wireless communication module and a second wireless communication module, the method comprising:
   assigning to each of the first and second wireless communication modules, respectively, a communication cycle defined by an integral multiple of a reference communication cycle, the reference communication cycle being set so that the first wireless communication module and the second wireless communication module can each execute data communication related to the processing of an application, respectively, in such reference communication cycle; and
   offsetting the time between the start time of the communication cycle of the first wireless communication module and the start time of the communication cycle of the second wireless communication module to avoid interference between the communication by the first and second wireless communication modules.

16. A method of claim 15, wherein the first and second wireless communication modules respectively execute communication using different protocols.

17. A method of claim 15, wherein the offset time is set to be equal to or longer than the actual communication period of the first wireless communication module during its communication cycle.

18. A method of claim 15, wherein the timing is arranged such that there is no overlap of the actual communication period of the first communication module and the actual communication period of the second wireless communication module.

19. The method of claim 15, wherein the reference communication cycle is set based on the frame rate of moving images.

20. The method of claim 15, the method comprising:
   setting the communication cycles of the first wireless communication module and the second wireless communication module, respectively, to greater than or equal to M+1 times the reference communication cycle, when the sum of a first communication period and a second communication period becomes greater than M times the reference communication cycle (M being an integer greater than or equal to 1), wherein the first communication period is a period during which a communication by the first wireless communication module is permitted, and the second communication period is a period during which a communication by the second wireless communication module is permitted.

* * * * *